United States Patent
Monden et al.

(10) Patent No.: US 7,082,730 B2
(45) Date of Patent: Aug. 1, 2006

(54) SEALING SYSTEM

(75) Inventors: Thomas Monden, Stetten (DE);
Manfred Klein, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 10 days.

(21) Appl. No.: 10/716,034

(22) Filed: Nov. 18, 2003

(65) Prior Publication Data
US 2004/0149390 A1   Aug. 5, 2004

(30) Foreign Application Priority Data
Nov. 20, 2002  (DE) ............... 102 54 086

(51) Int. Cl.
*E04C 2/00*    (2006.01)
(52) U.S. Cl. ............ 52/232; 52/220.8; 138/161; 403/199
(58) Field of Classification Search .......... 52/232, 52/221, 220.8, 1, 219, DIG. 6; 138/156, 138/166, 167, 161; 403/187, 192, 199; 285/24, 285/142.1, 136.1; 248/65, 70, 74.1, 74.2
See application file for complete search history.

(56) References Cited

U.S. PATENT DOCUMENTS

| | | | | |
|---|---|---|---|---|
| 3,036,572 A | * | 5/1962 | Castelli et al. ........... 602/78 |
| 3,857,140 A | * | 12/1974 | Leveen ........... 602/78 |
| 4,273,821 A | * | 6/1981 | Pedlow ........... 428/215 |
| 4,850,385 A | * | 7/1989 | Harbeke ........... 137/75 |
| 4,916,800 A | * | 4/1990 | Harbeke ........... 29/469 |
| 4,951,442 A | * | 8/1990 | Harbeke, Jr. ........... 52/745.2 |
| 5,103,609 A | * | 4/1992 | Thoreson et al. ........... 52/232 |
| 5,347,767 A | * | 9/1994 | Roth ........... 52/1 |
| 5,370,474 A | * | 12/1994 | Olson ........... 403/263 |
| 5,421,127 A | * | 6/1995 | Stefely ........... 52/1 |
| 5,452,551 A | * | 9/1995 | Charland et al. ........... 52/232 |
| 5,634,304 A | * | 6/1997 | Sakno ........... 52/232 |
| 5,947,159 A | * | 9/1999 | Takahashi ........... 138/156 |
| 5,970,670 A | * | 10/1999 | Hoffman ........... 52/232 |
| 6,029,412 A | * | 2/2000 | Gohlke ........... 52/232 |
| 6,314,692 B1 | * | 11/2001 | Munzenberger et al. ... 52/220.1 |
| 6,360,502 B1 | * | 3/2002 | Stahl, Jr. ........... 52/232 |
| 6,477,813 B1 | * | 11/2002 | Andresen ........... 52/220.8 |
| 6,725,615 B1 | * | 4/2004 | Porter ........... 52/232 |

FOREIGN PATENT DOCUMENTS

| | | |
|---|---|---|
| DE | 19852120 | 3/2000 |
| DE | 10217174 | 10/2003 |
| EP | 486299 | 5/1992 |
| WO | WO 68608 | 11/2000 |

* cited by examiner

*Primary Examiner*—Naoko Slack
(74) *Attorney, Agent, or Firm*—Abelman, Frayne & Schwab

(57) ABSTRACT

A sealing system (11) for sealing off a passage of a pipeline (2) in a wall (1) including a sealing strip (3) for sealing off the passage and three support members (4.1, 4.2, 4.3) for supporting the sealing strip (3). Each support member (4.1, 4.2, 4.3) has a fastening section (41.1) for attaching the support member (4.1, 4.2, 4.3) to the wall (1). The support elements (4.1, 4.2, 4.3) each have three sleeve sections (42, 43.1, 43.2). Engagement mandrels or points for engaging in the sealing strip (3) are provided on two of the sleeve sections (42.1, 43.2).

4 Claims, 5 Drawing Sheets

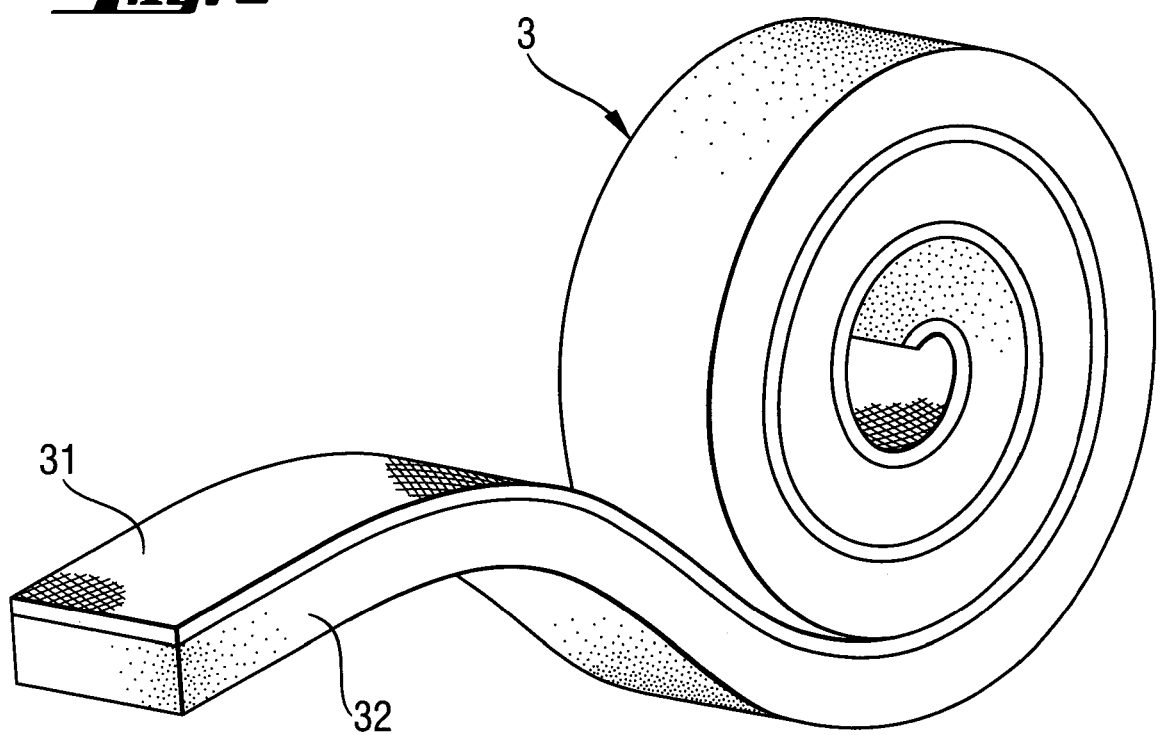

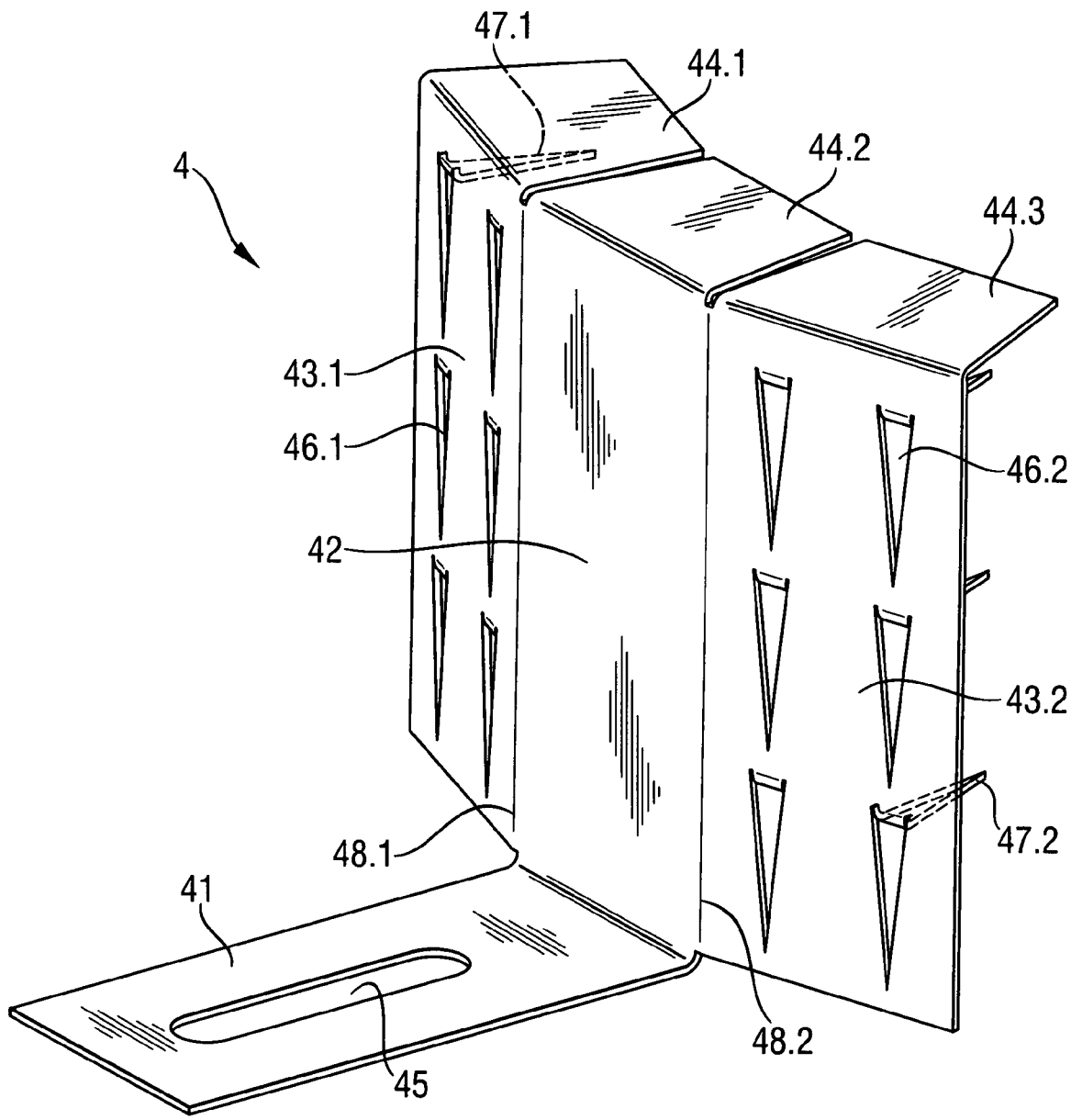

SEALING SYSTEM

BACKGROUND OF THE INVENTION

The invention relates to a sealing system for sealing off a conduit passage in a building component, in particular for sealing off a pipe line passage in a building component. The sealing system comprises at least one sealing means for sealing off the passage and at least two support members for holding the sealing means, wherein each support member has a fastening section for attachment of the support member to the building component. The invention further relates to a support member with a first member configured as a fastening section for fastening the support member to a building component and at least a second member configured as a sleeve segment for attaching an object, in particular a sealing means to the building component.

SUMMARY OF THE INVENTION

So-called fire protection sleeves are known that comprise an intumescing fire protection mass, which in the event of fire provides a fire and smoke proof sealing of the annular space between the building component and a pipe line passing through the building component. An assortment of fire protection sleeves of various lengths and inside diameters is common for different diameters and types of pipelines.

DE 198 52 120 A1 discloses, for example, a metal sheet shell having regularly spaced perforated apertures, which is bent around and surrounds the pipeline. The sleeve can be attached to the wall using loosely arranged, separate bracket-shaped wall hooks that run externally along the front of the fire protection sleeve and radially internally grip around the sleeve. Such wall hooks must be manufactured length-specific depending on the fire protection sleeve.

The pipe sleeve disclosed in DE 44 11 220 A1 has a metal sheet shell that can be bent around the pipe line and locked. Intumescing fire protection masses (e.g. expandable graphite) are arranged and distributed circumferentially in radially internal space of the shell. The shell can be mounted on the wall using separate bracket-like wall hooks, which can be engaged radially and externally in punched apertures in the metal sheeting of the fire protection sleeve. The punching of the holes requires a special costly tool.

The drawback in the known solutions is that although an expanded area of application of the individual design is possible by using these known sleeves, their manufacture and the availability of a plethora of wall mountings is expensive.

DETAILED DESCRIPTION OF THE INVENTION

The object of the present invention it to provide a flexible sealing system that can be used in all conduit passages in a building part and is simple to manufacture and easy to install. A further object of the present invention is the creation of a support member that is easy to manufacture and versatile to use for attaching an object to a building part.

The object according to the invention is achieved by a sealing system for sealing off a conduit passage in a building part, in particular for sealing off a pipe passage in a building part, comprising at least one sealing means for sealing off the passage and at least two support members for holding the sealing means. Each support member has a fastening section for attaching the support member to the building part. The support members each have at least two sleeve segments. Engagement means for engagement into the sealing means are provided on at least on one sleeve segment.

Different dimensions and cross-sectional shapes of conduit passages in walls, ceilings or floors can be reliably sealed off using the sealing system of the invention. The sealing means is arranged on the outer circumference of the conduit in the passage in the respective building part. The number of associated support members depends on the existing conditions, in particular the overall length of the circumference of the conduit and/or on the requirements, in particular the reliability of the sealing system to be installed. A plurality of support members can be laid out alongside each other along the entire circumference such that the sealing means is completely enclosed at its outer circumference by the sleeve segments of the support elements.

The connection between the sealing means and the support member is created by engaging means. The engagement means are formed by mandrels or points and are provided with or without counter-hooks, which penetrate into the sealing means such that a connection between the support member and the sealing means is established.

Preferably, the sealing means comprises a fabric tape, on which an inlay made of intumescent material is arranged. The sealing means is suitable for a fire-proof closure of the conduit passage. In the event of a fire, the intumescent material expands and provides a smoke-proof seal of the passage. The sealing means is reliably held on the building part by engagement means of the support elements that grip into the fabric tape of the sealing means even if the intumescent material may not be suitable because of its material properties for such a connection between the sleeve segments of the support members and the inlay.

In an alternative according to the invention, the sealing means encompasses a fabric tape, on which an inlay of a material that can expand on contact with liquids is arranged. The expandable material expands and seals off the passage fluid-tight or water tight upon entry of a liquid such as water. The sealing means is reliably held on the building part by engagement means of the support elements that grip into the fabric tape of the sealing means even if the expandable material may not be suitable because of its material properties for such a connection between the sleeve segments of the support members and the inlay.

Preferably, the sealing means can be cut to length and preferably the sealing means can be laid around the conduit. The sealing means is cut to the respective length of the length of the circumference of the pipeline to be sealed off and laid around the pipeline. The sealing means is flexible, making a fit of the sealing means on different cross-sectional shapes such as on a rectangular or round cross-section of the conduit or pipeline having different dimensions possible for this purpose. Preferably, the sealing means can be cut to length using a simple cutting tool such as shears or a knife.

Advantageously, a hinge is provided between the sleeve segments. The sleeve segments can be adapted to the pipeline or conduit depending on the cross-sectional shape and the dimensions of the conduit or pipeline. For example, in pipes with a small diameter the sleeve segments are bent more towards each other than in the case of pipes with a larger diameter. A support member can be provided at each of the corners of the conduit, whose sleeve segments are deflected, such that they are at right angles to each other if a passage having a rectangular conduit passing through it is to be sealed off using the sealing system according to the invention. The hinge between the sleeve segments can be configured by a tapering of the material or by a perforation along the contact surface between the sleeve segments. Additionally, the hinge can be formed by a film hinge or by a mechanical hinge.

A support member according to the invention has a first arm configured as a fastening section for fastening the support member to a building part and at least one second arm configured as a sleeve segment for attachment of an object, in particular a sealing means to the building part. A ceiling or a floor can be attached with the support members according to the invention along with sealing means sheet metal parts (e.g. sheet metal frames) such as, for example, inserts and covers on a building part, such as on a wall. The fastening section is provided with at least one opening (e.g. with a longitudinal opening) through which the at least one fastening means, such as a screw, is passed. A further sleeve segment is arranged on at least one side of the second arm for attaching the object. The support member can be adapted with the at least two sleeve segments to the orientation, dimensions and nature of the object to be attached.

Preferably, a support section is provided on at least one of the sleeve segments, at its free end, and is arranged substantially perpendicular to the sleeve section. The support member secures the fixing object against displacements in and/or vertical to the building part plane. A sealing means for sealing off a conduit passage can be secured in against shifts in the direction of the longitudinal axis of the conduit to be sealed off, in this embodiment of the support member according to the invention. Preferably, the objects to be attached have a stepped extension in a modular mass vertical to the plane of the building part or a stepped height in modular mass, such that only a small number of different support members need to be provided with factory-deflected support sections to attach the various designs of objects to the building part.

The support sections are preferably formed on the support members so that the support members can be adapted in situ, to make a flexible utilization of the support members in different applications possible. The support sections can also lie in one plane with the sleeve segments, such that the sleeve segments can be deflected in situ relative to the dimensions of the objects to be attached. The support sections are provided with intended bend points in a predefined pattern for this purpose.

Preferably engagement means are provided on at least one of the sleeve segments, which can be brought together into engagement with the object to be attached. The engagement means are configured as mandrels or points, with or without counter-hooks, that penetrate into the sealing means. The object preferably has such material properties that the engagement means can penetrate into the object and adequately attach it. Advantageously, the material of the object is compressed upon penetration of the engagement means. The object can be provided with a coating on its external surfaces or be enclosed with a skin made of a suitable fabric to assure adequate reliability of this connection. In addition, adhesion points can be provided on the at least one sleeve segment of the support member, said points creating an adhesive connection with the object upon contact of the prepared surfaces of the sleeve sections with the object.

Advantageously, the sleeve segments are connected in a hingelike fashion. Accordingly, the position of the at least two sleeve segments relative to each other can be adapted in simple fashion in situ, whereby only one design of the support element can be used with various cross-sectional shapes and dimensions of the object to be attached. The hinge between the sleeve segments can be configured by a tapering of the material or by a perforation along the contact surface between the sleeve segments. In addition, the hinge can be formed by a film hinge or by a mechanical hinge.

Preferably, the support member is manufactured out of sheet metal as a punched/bent part. The support member can be fabricated from a piece of sheet metal using few process steps. Furthermore, the support member can be manufactured out of a plastic in a so-called injection molding process.

BRIEF DESCRIPTION OF THE DRAWINGS

The exemplary embodiments of the invention will be more completely described with reference to the drawings, wherein:

FIG. 2 shows a perspective view onto a coiled sealing means according to the invention; and FIGS. 3a and 3b each show a perspective view onto a support member from two different angles of observation, according to the invention.

DETAILED DESCRIPTION OF THE INVENTION

In the following description with reference to the drawings, identical parts in the figures are identified using identical references.

Figure 1A:
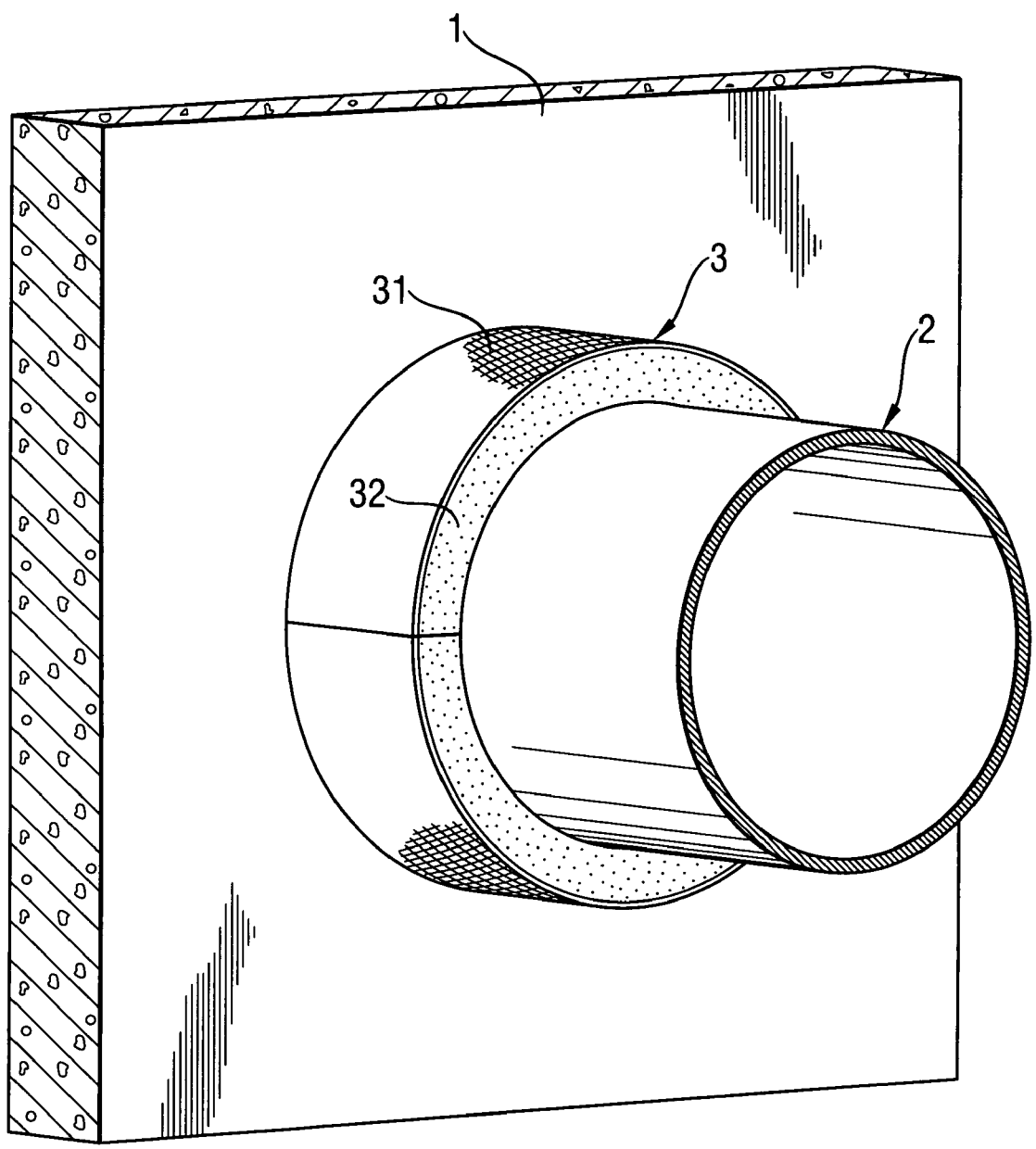
FIGS. 1a and 1b each show a perspective view onto a pipe passage with the sealing system, in two installation operations, according to the invention.

A perspective view onto a pipe passage with the sealing system, in a first installation operation according to the invention, is shown in FIG. 1. A pipeline 2 is passed through the illustrated wall section 1, whereby the passage is sealed off using the sealing system according to the invention. The sealing strip 3 is cut to the length of the existing circumferential length of the pipeline 2 and wrapped around it.

Figure 1B:
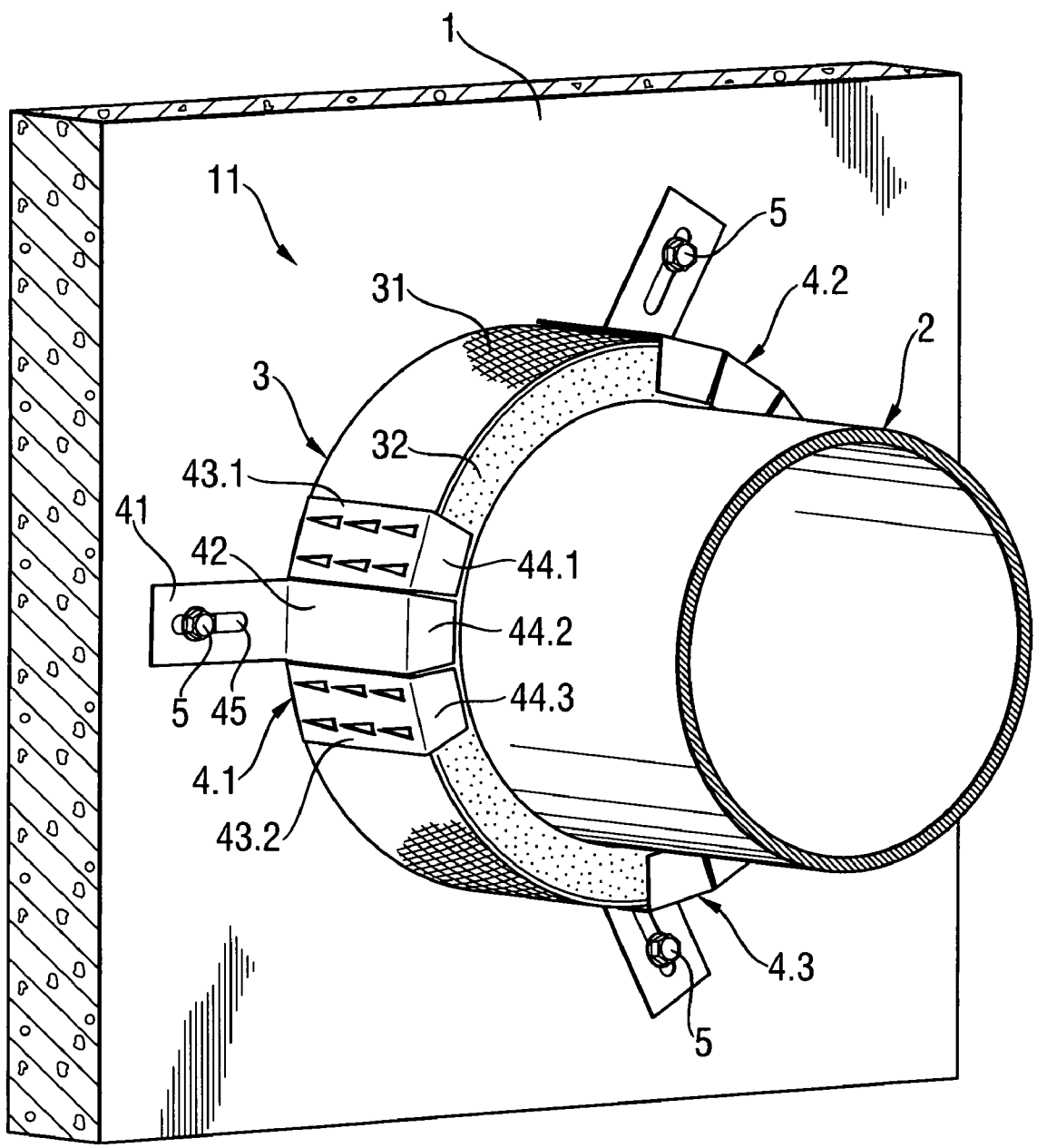

FIG. 1b shows the perspective view of FIG. 1 of the sealing system according to the invention, in a further installation step. Three support members 4.1, 4.2 and 4.3 are provided for attaching the sealing strip 3 to the wall 1. The constructive details of the support members 4.1, 4.2 and 4.3 are explained below.

FIG. 2 represents a perspective view onto a coiled sealing means. The sealing strip 3 comprises a fabric tape 31 as the carrier layer on which an inlay 32 is applied using an extrusion process. An inlay 32 made of an intumescent material is applied onto the fabric tape for a fire-proof sealing of the pipeline passage. An inlay 32 made of a material that expands on contact with a fluid is applied onto the fabric tape 31 for a liquid-tight seal. The sealing strip 3 can be rolled up or folded and can be cut to the desired length using a knife.

A perspective view onto a support member according to the invention is shown in FIG. 3a. The support element 4 comprises a fastening section 41 and a sleeve section 42 bent perpendicular to the fastening section 42. The fastening section 41 is provided with a longitudinal opening 45, through which a fastening means (a screw 5, for example) can be passed for fastening the support element to a building part. Two additional sleeve segments 43.1 and 43.2 are arranged hingelike on the sleeve segment 42. The hinges 48.1 and 48.2 between the sleeve section 43.1 and the sleeve section 42 and between the sleeve section 42 and the sleeve section 43.2 are formed by two material tapering. Engagement means 47.1 and 47.2 for engaging the support member 4 in an object in the sealing means 3, are formed on the sleeve sections 43.1 and 43.2 using punching 46.1 in the sleeve section 43.1 and punching 46.2 in the sleeve section 43.2.

Figure 3B:
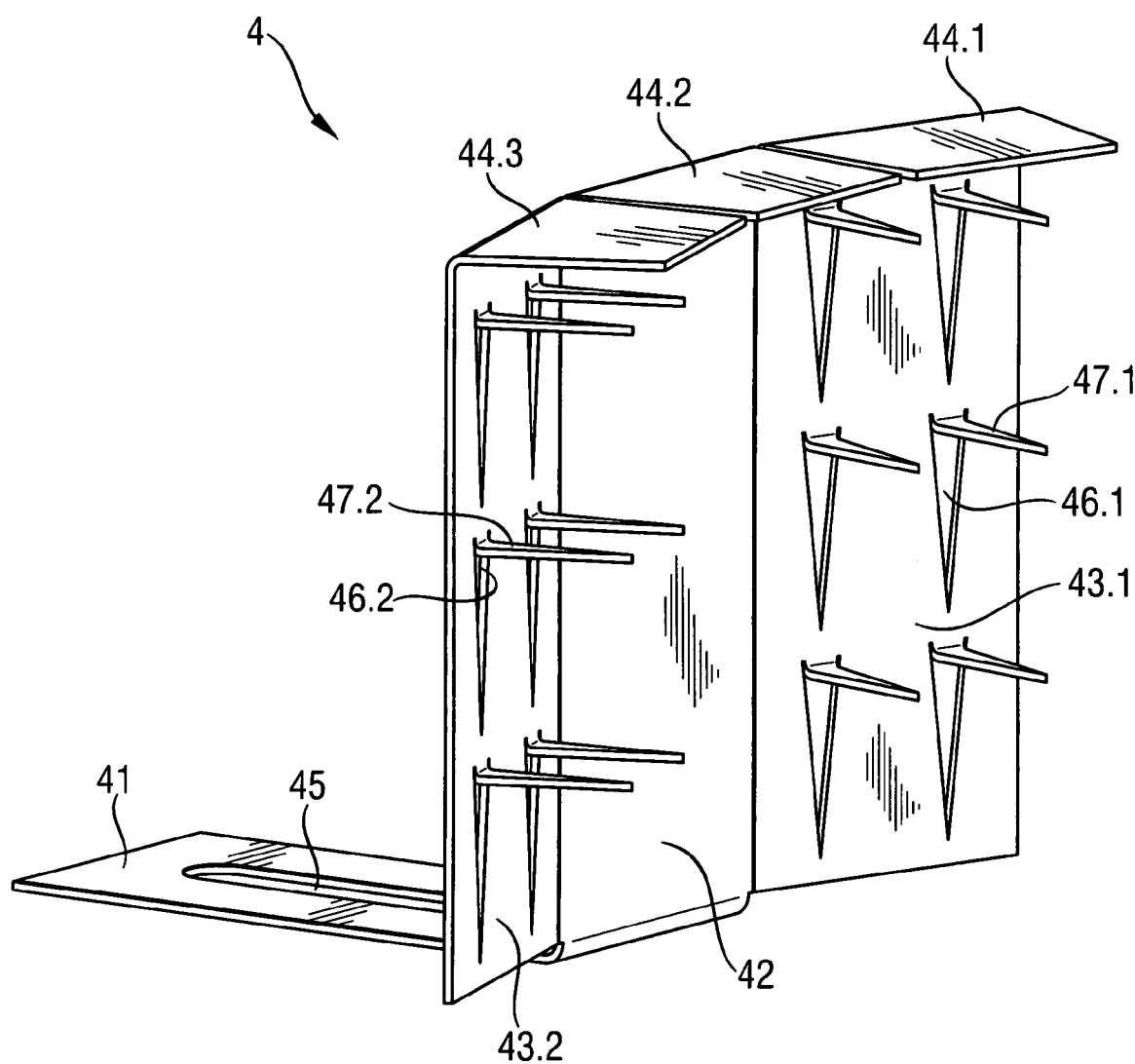

Support segments 44.1, 44.2 and 44.2 are deflected perpendicular to the sleeve segments 42, 43.1 and 43.1 at the ends of the sleeve sections 42, 43.1 and 43.2 situated opposite to the fastening section 41, which at least partially grip around the one object, such as the sealing means 3. FIG. 3b represents a further perspective view from another observation angle onto the support member shown in FIG. 3. The punched out engagement means 47.1 and 47.2 are configured as arrow-like points without counter-hooks.

In sum, a flexible sealing system was created using the invention, which can be used with all conduit passages in a building part and is easy to manufacture and install. Provision of different designs of sealing systems corresponding to the different pipeline dimensions and cross-sectional shapes used in practice is eliminated. In addition, an installation means for attaching a sealing means to a building part is provided using the support member according to the invention that is easy to manufacture and versatile to use.

What is claimed is:

1. A sealing system for sealing a conduit passage in a building part, comprising a sealing element (3) for the passage; and at least two separate support members (4; 4.1, 4.2, 4.3) freely arrangeable about a circumference of the sealing element (3) for securing the sealing element (3) to the building part, each of the at least two support members (4; 4.1, 4.2, .4.3) having a fastening section (41) for attaching the support member (4; 4.1, 42., 4.3) to the building part and at least two sleeve sections (42, 43.1, 43.2) for holding the sealing element (3), at least one of the at least two sleeve sections (43.1, 43.2) having engagement means (47.1, 47.2) for engaging the sealing element (3) for securely holding the same in place, wherein the sealing element (3) comprises a fabric tape (31) whereon an inlay (32) of intumescent material is applied.

2. A sealing system for sealing a conduit passage in a building part, comprising a sealing element (3) for the passage; and at least two separate support members (4; 4.1, 4.2, 4.3) freely arrangeable about a circumference of the sealing element (3) for securing the sealing element (3) to the building part, each of the at least two support members (4; 4.1, 4.2, .4.3) having a fastening section (41) for attaching the support member (4; 4.1, 42., 4.3) to the building part and at least two sleeve sections (42, 43.1, 43.2) for holding the sealing element (3), at least one of the at least two sleeve sections (43.1, 43.2) having engagement means (47.1, 47.2) for engaging the sealing element (3) for securely holding the same in place, wherein the sealing element (3) comprises a fabric tape (31) whereon an inlay (32) of material that expands upon contact with liquids is arranged.

3. The sealing system according to claim 2, wherein the sealing element (3) comprises a cut-to-length section of the fabric tape (31) for being wrapped around a conduit (2).

4. A sealing system for sealing a conduit passage in a building part, comprising a sealing element (3) for the passage; and at least two separate support members (4; 4.1, 4.2, 4.3) freely arrangeable about a circumference of the sealing element (3) for securing the sealing element (3) to the building part, each of the at least two support members (4; 4.1, 4.2, .4.3) having a fastening section (41) for attaching the support member (4; 4.1, 42., 4.3) to the building part and at least two sleeve sections (42, 43.1, 43.2) for holding the sealing element (3), at least one of the at least two sleeve sections (43.1, 43.2) having engagement means (47.1, 47.2) for engaging the sealing element (3) for securely holding the same in place, wherein the support member comprises a first arm with a fastening section (41) for fastening the support member (4) to the building part (1); and at least one second arm extending transverse to the first arm having three sleeve sections (42, 43.1, 43.2) arranged side by side for holding the sealing element (3), wherein the first arm is connected with a middle sleeve section (42), and wherein end sleeve sections (43.1, 43.2) are provided with engagement means (47.1, 47.2) for engaging the sealing element (3).

* * * * *